US012642727B2

(12) United States Patent
Song et al.

(10) Patent No.: US 12,642,727 B2
(45) Date of Patent: Jun. 2, 2026

(54) ELECTROMOTIVE TRANSFER DEVICE

(71) Applicant: NATIONAL REHABILITATION CENTER, Seoul (KR)

(72) Inventors: Won-Kyung Song, Seoul (KR); Kuem Ju Lee, Seoul (KR); Yu Mi Shin, Seoul (KR)

(73) Assignee: National Rehabilitation Center, Seoul (KR)

( * ) Notice: Subject to any disclaimer, the term of this patent is extended or adjusted under 35 U.S.C. 154(b) by 249 days.

(21) Appl. No.: 18/717,847

(22) PCT Filed: Nov. 23, 2022

(86) PCT No.: PCT/KR2022/018598
§ 371 (c)(1),
(2) Date: Nov. 18, 2024

(87) PCT Pub. No.: WO2023/121015
PCT Pub. Date: Jun. 29, 2023

(65) Prior Publication Data

US 2026/0144691 A1 May 28, 2026

(30) Foreign Application Priority Data

Dec. 23, 2021 (KR) ........................ 10-2021-0186315

(51) Int. Cl.
*A61G 7/10* (2006.01)

(52) U.S. Cl.
CPC ......... *A61G 7/1048* (2013.01); *A61G 7/1017* (2013.01); *A61G 7/1051* (2013.01); *A61G 2203/12* (2013.01); *A61G 2203/32* (2013.01)

(58) Field of Classification Search
CPC .. A61G 7/1051; A61G 7/1048; A61G 7/1046; A61G 7/1017
See application file for complete search history.

(56) References Cited

U.S. PATENT DOCUMENTS

2003/0167567 A1* 9/2003 Reed ....................... B66C 23/48 5/86.1
2006/0162069 A1 7/2006 Mowery
(Continued)

FOREIGN PATENT DOCUMENTS

KR 10-2019-0064366 A 6/2019
KR 10-2056022 B1 12/2019
KR 10-2020-0105076 A 9/2020

*Primary Examiner* — Matthew Troutman
*Assistant Examiner* — Ifeolu A Adeboyejo
(74) *Attorney, Agent, or Firm* — Rabin & Berdo, P.C.

(57) ABSTRACT

An electromotive transfer device includes: a center body (110); a lower frame (120) extended forward from the center body; a vertical frame (130) provided on the center body; an upper frame (140) rotatably connected to an upper end of the vertical frame and provided with a sling support (145) to which a sling is connected; an adjusting rod (150) connected to the vertical frame and the upper frame, and stretchable/contractable in a lengthwise direction so as to adjust the height of the sling; a motor and a battery; a control means (200); a first IMU sensor (S1) in the vertical frame (130); a second IMU sensor (S2) in the upper frame (140); and a third IMU sensor (S3) in the sling support (145) and monitoring a patient who is in the sling by sensing variation amount in the acceleration and angular acceleration of the sling support.

10 Claims, 4 Drawing Sheets

(56) References Cited

U.S. PATENT DOCUMENTS

| | | | | |
|---|---|---|---|---|
| 2009/0188038 | A1 | 7/2009 | Raney | |
| 2015/0272800 | A1* | 10/2015 | Park | A61G 7/1046 5/83.1 |
| 2015/0306440 | A1* | 10/2015 | Bucher | A63B 22/0023 482/4 |
| 2017/0181911 | A1* | 6/2017 | Fakhrizadeh | A61G 7/1074 |
| 2017/0273841 | A1* | 9/2017 | Maidens | A61G 7/1034 |
| 2018/0318161 | A1* | 11/2018 | Eriksson | A61G 7/1046 |
| 2018/0344557 | A1* | 12/2018 | Bolin | A61G 7/1065 |
| 2021/0137768 | A1* | 5/2021 | Buswell | A61H 3/04 |
| 2021/0378898 | A1* | 12/2021 | Saayman | A61G 7/1051 |
| 2022/0054340 | A1* | 2/2022 | Oestergaard | A61H 3/008 |
| 2022/0151850 | A1* | 5/2022 | Tiu | A61G 7/1017 |
| 2024/0180765 | A1* | 6/2024 | Custeau-Boisclair | B60B 33/025 |
| 2024/0315650 | A1* | 9/2024 | Jorgensen | A61G 7/1013 |

* cited by examiner

ELECTROMOTIVE TRANSFER DEVICE

TECHNICAL FIELD

The present invention relates to a transfer device that can be used for transfer and rehabilitation exercises for patients with limited mobility, and more particularly, to an electromotive mobile transfer device that can reduce the burden of having to carry a care receiver and that is equipped with a means for rotating the transfer device frame up to a predetermined angle to facilitate easy use on beds and the like while preventing tip-over.

BACKGROUND ART

In Korea, the birth rate is currently declining while advances in medical technology are increasing the average lifespan, so the proportion of the elderly population is gradually increasing. In addition, the number of individuals with disabilities in need of rehabilitation from injuries sustained from occupational accidents at various workplaces and industrial sites and traffic accidents is also increasing. Patients with limited mobility due to aging or injury have difficulties moving around and performing daily tasks on their own, so most of them need assistance from full-time nursing staff to carry out daily activities.

Such patients with limited mobility can use large medical institutions equipped with nursing staff, medical equipment, and rehabilitation exercise equipment, but the number of large medical institutions is limited compared to the demand and the financial burden of patients using the institutions is not small. Therefore, most patients have no choice but to use medical institutions with relatively poor facilities or stay at home with the help of their family members.

In addition, patients with limited mobility spend a lot of time lying on the bed or floor and need assistance from nursing staff or wheelchairs to move. When a nursing staff lifts or supports a patient with limited mobility in a low position to move the patient, there is a very high risk of injury due to the concentration of load on the waist.

Transfer devices are used to move patients with limited mobility, but the related transfer devices are often too large and heavy for a single nurse or caregiver to handle.

In addition, the related transfer devices have two wheels each at the front and rear, and user feedback indicates that driving and steering the wheels are rather cumbersome. The related mobile transfer devices employ a sling such that when a person is seated therein, the weight of the person adds up with the weight of the mobile transfer device and the combined weight poses a challenge for an operator to move the transfer device. At this time, it is difficult to move the mobile transfer device in the intended direction, especially during steering maneuvers, and physical strain on the operator increases consequently.

In addition, to place the related transfer device onto a bed with a patient in the sling of the transfer device, the lower frame of the transfer device may become entangled with the bed frame such that the transfer device cannot be fully placed onto the bed or the patient cannot be properly positioned on the head or foot of the bed, causing inconvenience, and as a result, direct transfer of the patient from the sling of the transfer device to the bed is made impossible only to incur significant inconvenience for both the operator and the patient.

DETAILED DESCRIPTION OF INVENTION

Technical Problem

In order to solve the problems of the related transfer device, an object of the present invention is to reduce the burden on the operator's musculoskeletal system and facilitate easy use of the transfer device during transfer operations, by employing wheels with driving force for the wheels of the transfer device and providing operating tools for facilitating driving and steering.

In addition, another object of the present invention is to provide a means for directly moving a patient to a bed from a sling mounted in the transfer device by improving a vertical or lower frame of the transfer device

Technical Solution

The present invention provides an electromotive transfer device, which may include a center body 110 provided with a driving wheel (W) on a lower portion thereof, the driving wheel (W) exhibiting a driving force and a steering force, a lower frame 120 which is extended forward from the center body and has a roller on a lower end of a front end portion, a vertical frame 130 of which a lower end is provided on the center body to be rotatable, an upper frame 140 of which one end is rotatably connected to an upper end of the vertical frame and the other end is provided with a sling support 145 to which a sling for carrying a patient is connected, an adjusting rod 150 of which a lower end is connected to the vertical frame and an upper end is connected to the upper frame, and which is stretchable and contractable in a lengthwise direction so as to adjust the height of the sling, a motor and a battery for supplying a rotating force required by the driving wheel, a control means 200 for controlling the driving force and the steering force of the driving wheel (W), a first IMU sensor (S1) which is provided in the vertical frame 130 and senses movement in forward and backward direction and turning of the transfer device, a second IMU sensor (S2) which is provided in the upper frame 140 and senses ascending and descending postures of the upper frame, and a third IMU sensor S3 which is provided in the sling support 145 and monitors the patient who is in the sling by sensing variation amount in the acceleration and angular acceleration of the sling support.

The control means may be provided in the vertical frame 130, or the control means may be provided separately from the transfer device and the operation signal of the control means may be wirelessly transmitted to the control unit provided inside the transfer device, and the control means may be in the form of any of a joystick, a button, or a force sensor.

The driving wheel W may include a wheel frame W1, and two, first and second, wheels W2 and W3 provided on the wheel frame, facing each other, and the first and second wheels W2 and W3 may be simultaneously driven to move in forward and backward direction, or driven in only one of the two directions to change directions.

The driving wheel W may include a wheel frame, and one wheel positioned at a lower end of the wheel frame, and may be able to move in forward and backward direction and change directions.

The lower frame may include two frames extending forward from the center body, with first and second encoders E1 and E2 provides at front ends thereof, respectively, and the first and second encoders may sense linear motion and rotational motion of the transfer device and output the sensed result as an electrical signal.

The vertical frame 130 may be provided such that a lower end thereof is rotatable within a range of 5° clockwise or counterclockwise with respect to an axis perpendicular to the ground at a connection point with the center body 110, and it is preferable that a locking device is additionally provided, to allow the vertical frame to remain locked in the rotated state.

Effects of Invention

The transfer device according to the present invention has the effect that the convenience of the caregiver who is operating the transfer device for driving and steering operations is improved with the means described above, and that it is possible to conveniently transfer the patient directly from the sling of the transfer device to the bed, and that it is possible to modify a point to fasten the sling without the need to remove the transfer device from the bed.

That is, the transfer device of the present invention is equipped with the motor so as to provide forces to move straight and turn through the wheels that exhibit the driving force and the rotating force, and when necessary, adds additional convenience by monitoring the driving and steering behavior by applying algorithms using IMU sensors and giving warning and alarms (sounds, lights, vibrations) when danger is recognized.

BEST MODE FOR EMBODYING INVENTION

The objectives, specific advantages, and novel features of the present invention will become more apparent from the following detailed description and the preferred embodiments, which are associated with the accompanying drawings. In addition, terms described herein are terms defined in consideration of functions in the present invention, which may vary according to the intention or custom of the user or operator. Therefore, definitions of these terms should be made based on the contents throughout the description.

Figure 1:
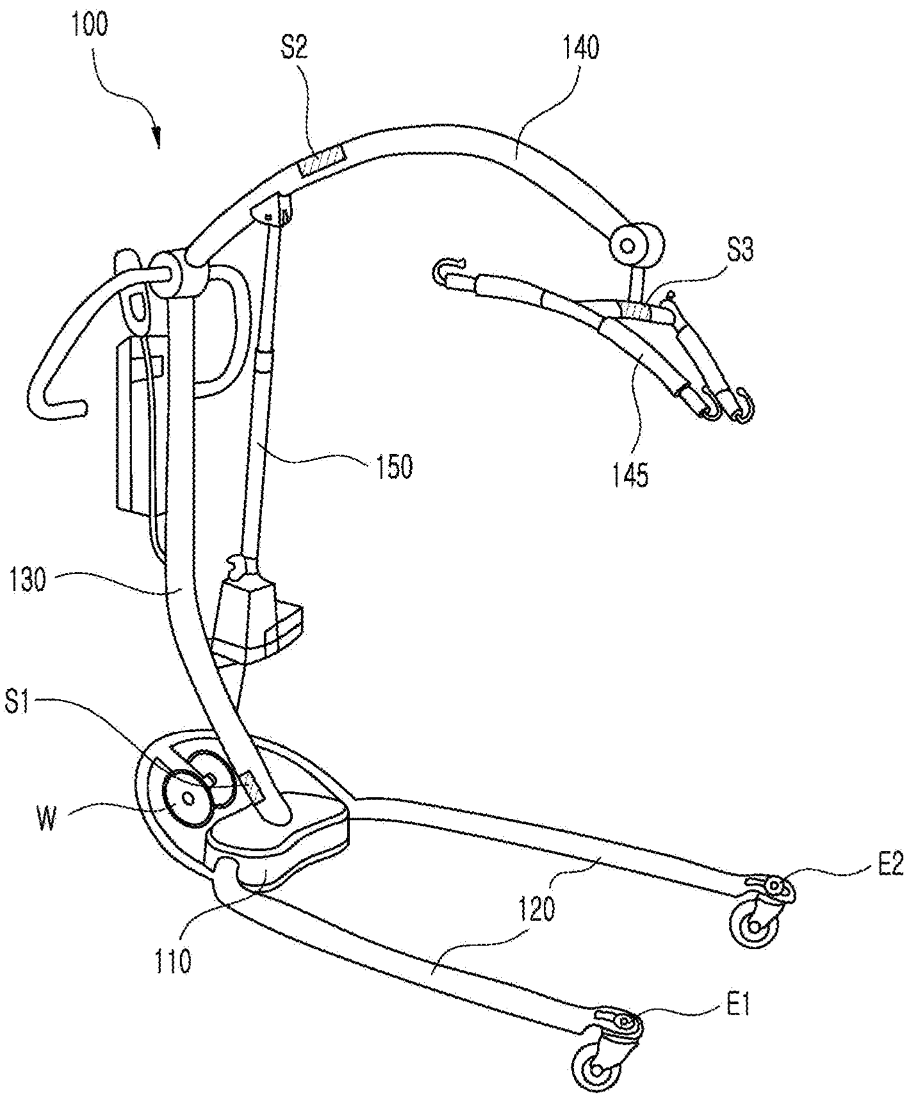
FIG. 1 is a perspective view of an electromotive transfer device according to the present invention.
Figure 2:
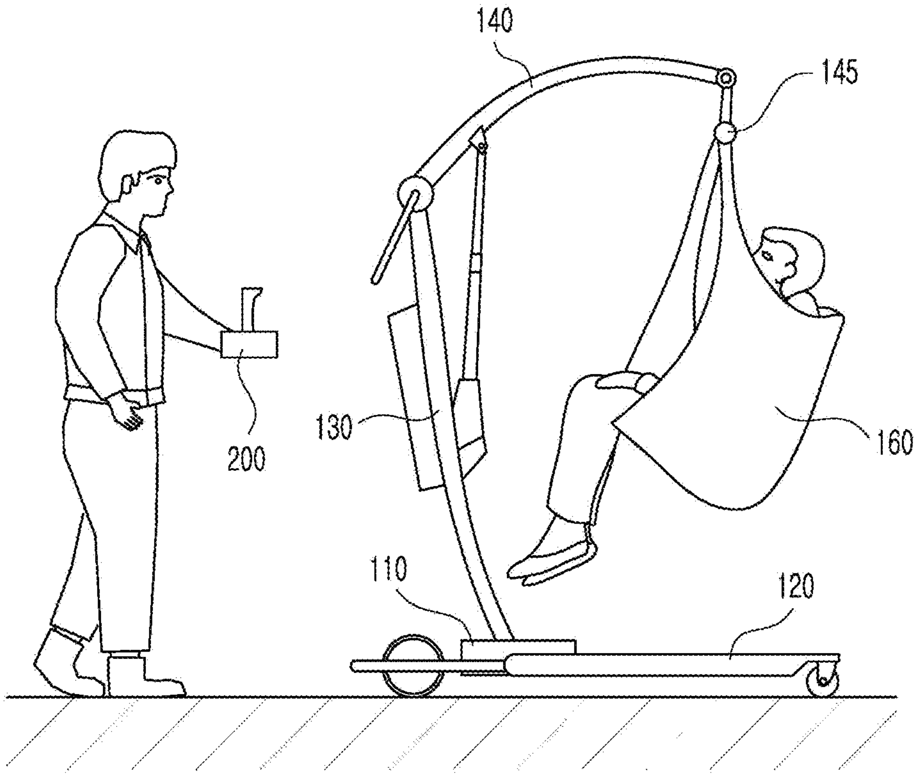
FIG. 2 shows a transfer device moving with a patient in a sling according to the present invention.
Figure 3:
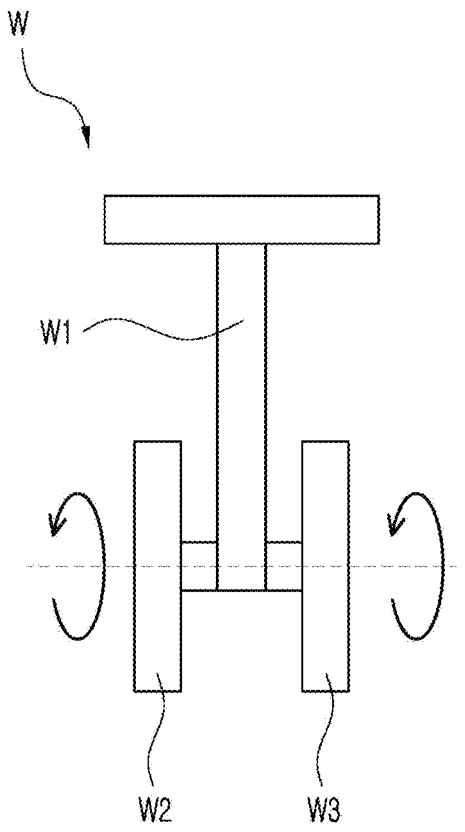
FIGS. 3 and 4 show an example of a driving wheel provided in an electromotive transfer device according to the present invention.
Figure 4:
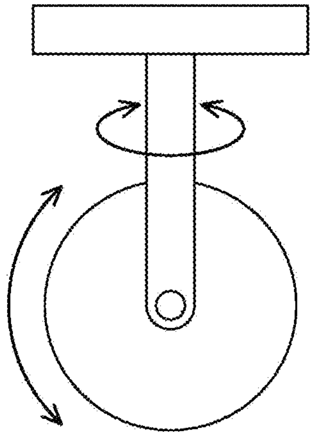

FIG. 1 is a perspective view of an electromotive transfer device according to the present invention. FIG. 2 shows a transfer device moving with a patient in a sling according to the present invention. FIGS. 3 and 4 show an example of a driving wheel provided in an electromotive transfer device according to the present invention.

Hereinafter, the present invention will be described in detail with reference to the accompanying drawings.

Referring to FIGS. 1 and 2, to describe a transfer device according to the present invention first, the transfer device 100 according to the present invention includes, among others, a center body 110 that forms a center body of gravity, which is an area where weight is concentrated during transfer of a patient, a lower frame 120 extending toward a front side of the center body, a vertical frame 130 provided on an upper part of the central body, an upper frame 140 installed rotatably on the vertical frame to allow the sling to move up and down, and a sling support 145 which is hung from the upper frame and on which the sling is installed.

The driving wheel W, driven by motor power, is disposed under the center body 110, and the driving wheel has a structure so as to be movable in the forward and backward direction by a driving force, and also rotatable with respect to a vertical axis to allow left and right steering. To this end, a battery that supplies power required for the driving wheel, a motor that transfers rotating force to the driving wheel, and the like are provided, but a detailed description of the structures thereof will be omitted as this is well known.

In addition, the lower frame 120 includes two frames formed on both sides, which extend forward from the center body, and support the weight of the patient in the upper sling. Rollers are provided at lower ends of front end portions of the lower frames to allow the transfer device to move in forward and backward direction or to rotate in left and right direction, in which first and second encoders E1 and E2 are provided at a front end of each of the rollers. The first and second encoders may sense a linear motion of the transfer device in the forward and backward direction and a rotational motion of the steering in the left and right direction, and output the sensed result as an electrical signal and transmit it to a control unit. Accordingly, the encoders may sense a dangerous situation while moving forward or turning left and right and transmit the sensed result to the control unit to warn of the dangerous situation.

The vertical frame 130 is a part that is rotatably connected to the center body in a vertical direction and is rotatably disposed on the body part 110 to be rotated up to a predetermined angle. The angle of rotation is preferably about 5° left and right. That is, a lower end of the vertical frame 130 is provided to be rotatable within a range of 5° clockwise or counterclockwise with respect to an axis perpendicular to the ground at a connection point with the center body 110. In addition, it is preferable that a locking device is additionally provided, to allow the vertical frame to remain locked in the position rotated within the range of 5°.

Figure 5:
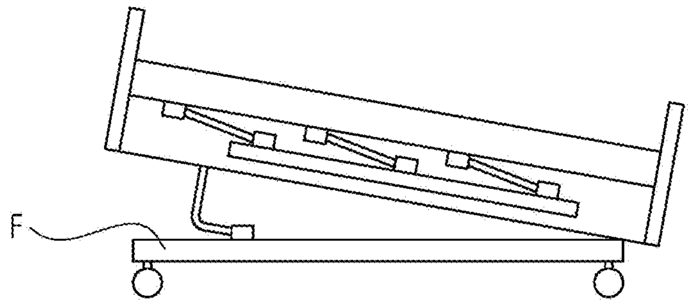
FIG. 5 shows a general view of a bed.

In the case of the related transfer device, as the lower frame is moved close to the bed, the lower frame 120 of the transfer device may become entangled with the frame of the bed (F in FIG. 5), preventing the lower frame of the transfer device from further approaching the bed, or once the transfer device is placed near the bed, it is not possible to adjust the position of the patient upwardly or downwardly. Accordingly, in order to transfer the patient from the transfer device to the bed, it is necessary to separate the sling from the transfer device and move only the sling to the bed, or make sure that the frame is adjusted to fit the patient's height without becoming entangled, and then move only the sling to the bed, which is very cumbersome.

To solve this problem, the present invention provides the vertical frame 130 of the transfer device, which is rotatable slightly left and right so that the patient in the sling can be moved to the head or foot of the bed while the transfer device is placed on the side of the bed. In this state, the present invention allows the patient in the sling to be transferred directly to the bed, which is very convenient. The vertical frame includes a locking device that prevents it from rotating while in motion, for example, during transfer. In addition, when it is necessary to rotate the vertical frame for the transfer to the bed, the locking device is released and the vertical frame is rotated. The caregiver may rotate the vertical frame manually, or may automatically rotate the vertical frame by controlling a control means (UI, manipulation device, control unit) that may be provided to control the operations of the transfer device, which will be described below. Meanwhile, if the vertical frame 130 is rotated excessively, the transfer device may tip over. Accordingly, the rotation should only be performed within a range that does not result in tip-over, and in the present invention, the range of the rotation angle is limited to 5°.

In addition, the upper frame 140 of the present invention has one end rotatably connected to the upper end of the vertical frame, and the other end connected to the sling support 145 of the sling for carrying the patient. The upper frame 140 is configured such that, as the length of an adjustment rod 150 to be described below is expanded and contracted, the other end of the upper frame is moved in the vertical direction, according to which the sling support is moved up and down.

The lower end of the adjustment rod 150 is connected to the vertical frame at a certain lower position, and the upper end is connected to the upper frame at a certain point, thus allowing expansion and contraction in the lengthwise direction. The principle of the expansion and contraction in the lengthwise direction of the adjustment rod is that the adjustment rod includes one hollow member and a movable member that is received in the hollow member and can be withdrawn, and the movable member is moved in the lengthwise direction by the power from the motor, etc. As the length of the adjustment rod is expanded and contracted, the upper frame 140 is turned with respect to the connection point with the vertical frame, thereby moving the sling support 145 up and down.

In addition, FIGS. 3 to 4 illustrate the shape of the driving wheel W located under the center body of the transfer device of the present invention.

The driving wheel W of the present invention may exhibit a driving force to move in the forward and backward direction, and may also exhibit a steering force required for the rotation in the left and right direction, thus relieving the inconvenience of the caregiver of having to push the transfer device directly. Referring to FIG. 3, the driving wheel W may include a wheel frame W1 and two (i.e., first and second) wheels W2 and W3 provided on the wheel frame, facing each other, in which the first and second wheels W2 and W3 may be simultaneously driven to move in the forward and backward direction, or only one of the two wheels may be driven to change the left and right direction. Referring to FIG. 4, the driving wheel W may include the wheel frame and one wheel located at a lower end of the wheel frame, and likewise FIG. 3, it may move in the forward and backward direction and change the left and right direction.

Controlling the driving wheel may be performed by a separate control means (UI) 200, and the control means may be provided in an appropriate position in the vertical frame 130 of the transfer device, with which the caregiver may control the transfer device in the process of moving it. Alternatively, the control means may be provided separately from the transfer device and control the transfer device wirelessly. That is, the control means may be separated from the main body of the transfer device and operated by the caregiver by hand, and the operation signal of the control means may be wirelessly transmitted to the control unit provided inside the transfer device.

In addition, the present invention may include a plurality of IMU sensors to acquire data for controlling the transfer device. This may include a first IMU sensor S1 which is provided in the vertical frame 130 and senses a straight movement and turning of the transfer device, a second IMU sensor S2 which is provided in the upper frame 140 and senses the ascending and descending postures of the upper frame, and a third IMU sensor S3 which is provided in the sling support 145 and monitors the patient who is in the sling by sensing variation amount in the acceleration and angular acceleration of the sling support.

The transfer device according to the present invention has the effect that the convenience of the caregiver who is operating the transfer device for driving and steering operations is improved with the means described above, and that it is possible to conveniently transfer the patient directly from the sling on the upper side of the transfer device to the bed.

That is, the transfer device of the present invention provides forces to move straight and turn through the wheels that exhibit the driving force and the rotating force, and when necessary, adds additional convenience by monitoring the driving and steering behavior by applying algorithms using IMU sensors and giving warning and alarms when danger is recognized.

Although the present invention has been described in connection with some examples herein, the present invention should not be limited to those examples only, and various other changes and modifications made by those skilled in the art from the basic concept of the present invention are also within the scope of the claims appended herein.

The invention claimed is:

1. An electromotive transfer device comprising:

a center body (110) provided with a driving wheel (W) that exhibits a driving force and a steering force;

a lower frame (120) which is extended forward from the center body and has a roller on a lower end of a front end portion;

a vertical frame (130) of which a lower end is provided on the center body to be rotatable;

an upper frame (140) of which one end is rotatably connected to an upper end of the vertical frame and the other end is provided with a sling support (145) to which a sling for carrying a patient is connected;

an adjusting rod (150) of which a lower end is connected to the vertical frame and an upper end is connected to the upper frame, and which is stretchable and contractable in a lengthwise direction so as to adjust the height of the sling;

a motor and a battery for supplying a rotating force required by the driving wheel;

a control means (200) for controlling the driving force and the steering force of the driving wheel (W);

a first IMU sensor (S1) which is provided in the vertical frame (130) and senses movement in forward and backward direction and turning of the transfer device;

a second IMU sensor (S2) which is provided in the upper frame (140) and senses ascending and descending postures of the upper frame; and a third IMU sensor (S3) which is provided in the sling support (145) and monitors a patient who is in the sling by sensing variation amount in an acceleration and angular acceleration of the sling support.

2. The electromotive transfer device according to claim 1, wherein the control means is provided in the vertical frame (130).

3. The electromotive transfer device according to claim 1, wherein the control means is provided separately from the transfer device, and an operation signal of the control means is wirelessly transmitted to a control unit provided inside the transfer device.

4. The electromotive transfer device according to claim 2, wherein the control means is provided in a form of any one of a joystick, a button, or a force sensor.

5. The electromotive transfer device according to claim 1, wherein the driving wheel (W) includes a wheel frame (W1), and two, first and second, wheels (W2 and W3) provided on the wheel frame, facing each other, and the first and second wheels (W2 and W3) are simultaneously driven to move in forward and backward direction, or driven in only one of the two directions to change directions.

6. The electromotive transfer device according to claim 1, wherein the driving wheel (W) includes a wheel frame, and one wheel positioned at a lower end of the wheel frame, and is able to move in forward and backward direction and change directions.

7. The electromotive transfer device according to claim 1, wherein the lower frame includes two frames extending forward from the center body, with first and second encoders (E1 and E2) provides at front ends thereof, respectively, and the first and second encoders sense linear motion and rotational motion of the transfer device and output the sensed result as an electrical signal.

8. The electromotive transfer device according to claim 1, wherein the vertical frame (130) is provided such that a lower end thereof is rotatable within a range of 5° clockwise or counterclockwise with respect to an axis perpendicular to a ground at a connection point with the center body (110).

9. The electromotive transfer device according to claim 8, further comprising a locking device that locks the vertical frame in the rotated state.

10. The electromotive transfer device according to claim 3, wherein the control means is provided in a form of any one of a joystick, a button, or a force sensor.

* * * * *